(12) United States Patent
Maltby

(10) Patent No.: US 7,051,588 B1
(45) Date of Patent: May 30, 2006

(54) FLOATING PLATFORM SHOCK SIMULATION SYSTEM AND APPARATUS

(75) Inventor: John D. Maltby, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 56 days.

(21) Appl. No.: 10/859,310

(22) Filed: Jun. 2, 2004

(51) Int. Cl.
*G01L 1/04* (2006.01)

(52) U.S. Cl. ......................................... 73/161

(58) Field of Classification Search .... 73/12.01–12.09, 73/865.6, 161
See application file for complete search history.

(56) References Cited

U.S. PATENT DOCUMENTS

| | | | | |
|---|---|---|---|---|
| 6,193,206 B1 * | 2/2001 | Yasuda et al. | ............... | 248/550 |
| 6,302,069 B1 * | 10/2001 | Moyer | ..................... | 123/90.11 |
| 6,677,844 B1 * | 1/2004 | Gorospe et al. | ............ | 335/220 |
| 2004/0051197 A1 * | 3/2004 | Bald | ........................... | 264/69 |

* cited by examiner

*Primary Examiner*—Max Noori
(74) *Attorney, Agent, or Firm*—Peter A. Lipovsky; Michael A. Kagan; Allan Y. Lee

(57) ABSTRACT

A shock simulation system including a support plane, a first mass element and a first spring element attached between the support plane and the first mass element. Also included, is a second mass element that is attached to the first mass element with a second spring element as well as a cocking apparatus, positioned between the support plane and the second mass element, that is capable of accumulating and storing energy in the spring elements. The system also includes a trigger for releasing the energy stored in the springs and for causing a mechanical shock event that is substantially transferred to the second mass.

20 Claims, 8 Drawing Sheets

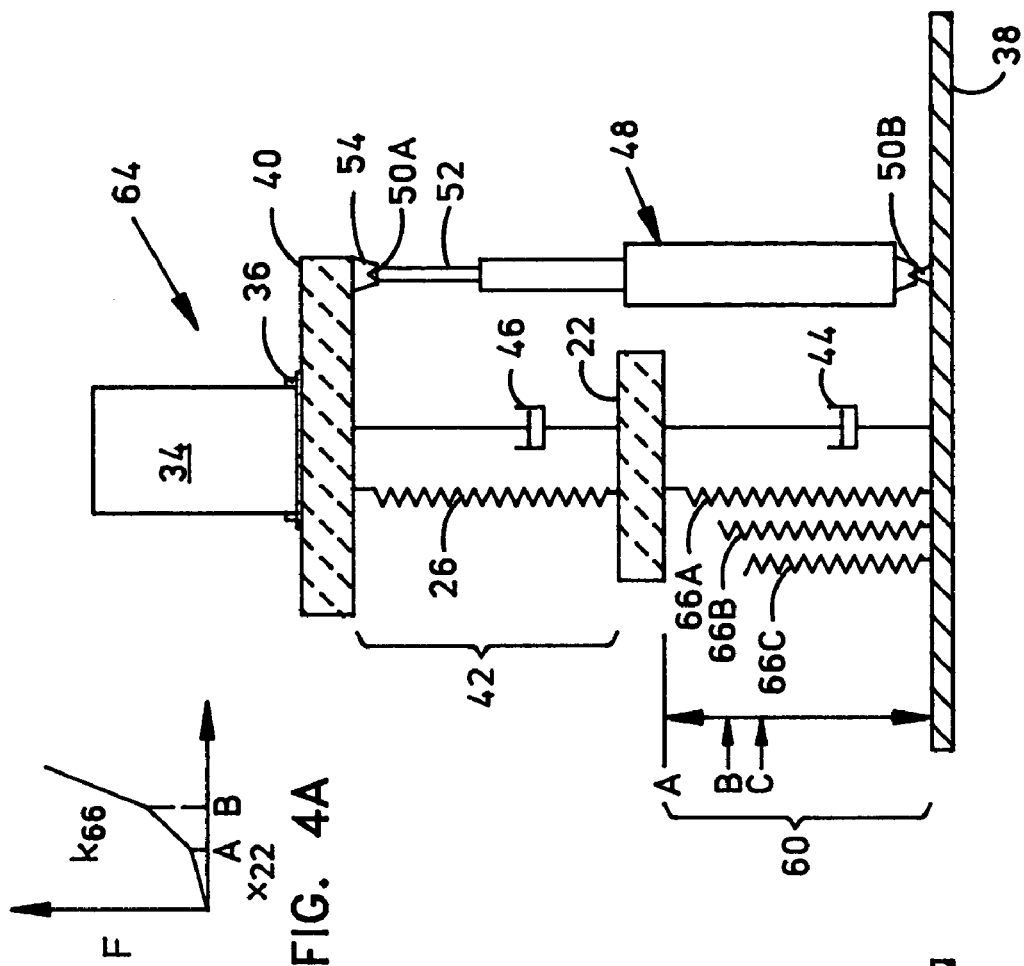
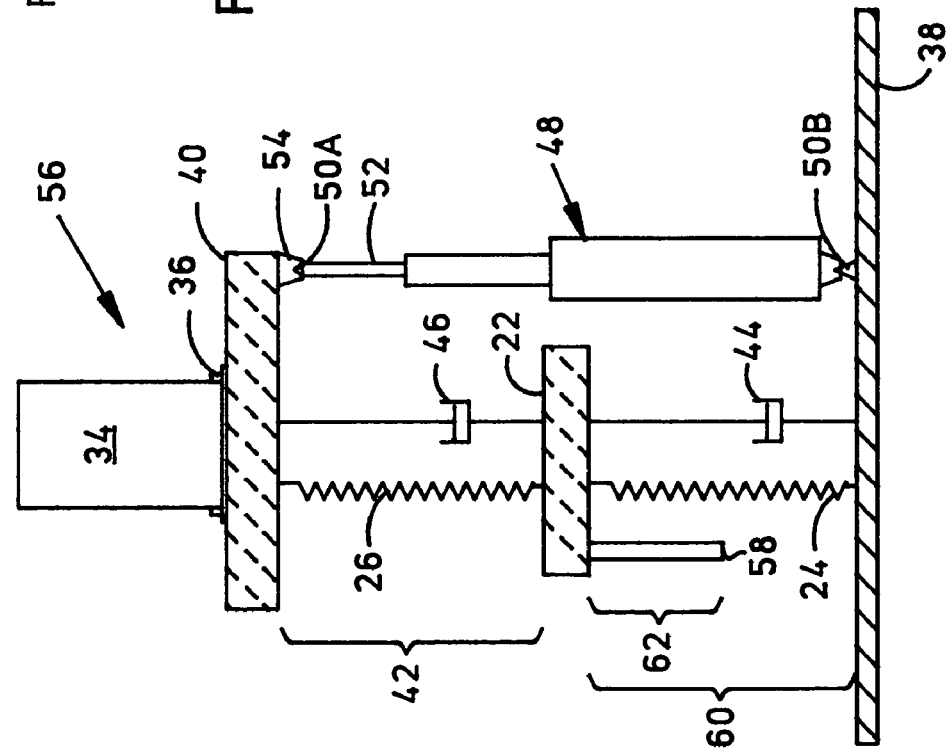

FLOATING PLATFORM SHOCK SIMULATION SYSTEM AND APPARATUS

STATEMENT OF GOVERNMENT INTEREST

The invention described herein may be manufactured and used by or for the Government of the United States of America for Governmental purpose without the payment of any royalties thereon or therefore.

FEDERALLY-SPONSORED RESEARCH AND DEVELOPMENT

This application is assigned to the United States Government and is available for licensing for commercial purposes. No license is necessary when used for Governmental purposes. Licensing and technical inquiries should be directed to the Office of Patent Counsel, Space and Naval Warfare Systems Center, San Diego, Code 20012, San Diego, Calif., 92152; telephone (619)553-3001, facsimile (619)553-3821.

BACKGROUND OF THE INVENTION

1. Field of the Invention

This invention relates generally to hydrostatic shock simulation systems and more particularly to apparatus for simulating the shock effects on barge-mounted equipment of an underwater weapon detonation.

2. Description of the Related Art

Perhaps the most demanding requirement of a naval surface environment is the effects of underwater explosions and concussions. Major underwater explosions transmit impulses through nearly incompressible water, causing substantial shock impulses of up to 50 g or more to the vessel. The shipboard equipment on Navy vessels must be designed to withstand the significant shock effects of underwater weapon detonations during wartime. The design of such shipboard equipment requires shock testing to verify design efficacy and the Navy has developed and promulgated the shock test specification MIL-S-901D (17 Mar. 1989) setting forth the requirements for qualifying the design of shipboard equipment. MIL-S-901D also classifies shipboard equipment as a "principle unit" that is directly supported by the ship structure, a "subsidiary component" that is a major part of and affects the shock response of a principle unit, or a "subassembly" that is a part of but does not materially affect the shock response of either a principle unit or a subsidiary component. This Military Specification defines a "heavyweight" test category that mandates shock testing "on a standard or large floating shock platform" that herein is denominated a "test barge." Acceptable testing for heavyweight shocks is quite challenging, usually requiring actual detonation of explosive devices near a floating barge containing the principle unit equipment. Some of the most devastating impulses are created by the aftershock concussions (secondary bubble pulses), which result in a decaying wave of compression and rarefaction that transmits even greater shock energy to the unit under test. In one test scenario, a specific explosive charge is detonated 24 feet below the surface and electronic equipment mounted on the hull of a floating barge is subjected to the impulse. The range of shock varies, but can approach 50 g. According to MIL-S-901D, the lighter test categories may be performed in the laboratory by using various shock machines but, to properly test for the effects of secondary bubble pulses, the heavyweight tests must be performed on a test barge subjected to an actual underwater detonation, which is intrinsically hazardous.

As used herein and in the art, a barge generally denominates a flat-bottom boat for carrying heavy loads in rivers or canals. The flat bottom and general absence of provisions for withstanding large wave-induced stresses distinguishes the barge from other marine vessels such as those intended for operation on the high seas.

The two conventional land-based Navy shock tests are the Lightweight Shock Machine and Medium Weight Shock Machine, adapted for testing no more than 550 lbs and 7,400 lbs of mounted equipment, respectively, according to MIL-S-109D. These two hammer tests do not properly stress equipment that is resiliently mounted because they provide neither a sufficient platform displacement nor a proper frequency response in the lower end of the shock response spectrum (SRS). Adding a spring-deck apparatus to the Medium Weight Shock Machine can adjust the SRS but does not achieve sufficient platform displacement. A high platform displacement at low frequencies with resonant characteristics similar to a ship deck is necessary to properly stress equipment protected with shock isolators because only this condition can properly bottom-out the shock isolators. When the isolators are bottomed-out, the equipment can be subjected to a more severe shock than seen without isolation (i.e., "hard-mounted"). The heavyweight shock test on a barge subjected to underwater explosive detonation was until now the only test known to properly stress principle unit equipment resiliently mounted on ship decks. Such a barge test is considerably more expensive and hazardous and requires more lead time than a land-based laboratory test. The heavyweight barge test ensures that the principle unit and other items are subjected to a shock wave representing a realistic simulation of actual operational conditions aboard a Navy warship. Until now, such a shock wave could not be realistically simulated in the land-based laboratory.

Several practitioners in the art have proposed improved shock simulation systems for laboratory testing and qualification of electronic equipment. For example, in U.S. Pat. No. 6,182,495 B1, Hansen discloses a test machine for simulating shock-wave induced motion adapted to be carried on marine vessels during sea travel. The equipment under test is mounted on the table of a test machine through which shock-wave induced motion to be experienced by such equipment during the sea travel is simulated and applied to the equipment carrying table by means of coil springs. Such simulated motion is initiated from a position of the table to which it is displaced and from which it is selectively released through a latch device. However, Hansen neither considers nor suggests solutions to the MIL-S-901D heavyweight secondary bubble pulse simulation problem. In a recent publication, Brooks et al. [Rick Brooks and Jack Berenholz, "Part 1 Case Study: Testing High-Powered Signal Processing Systems for Harsh Environments," *COTS Journal*, October 2002, pp. 40–45] proposes using a finite-element analysis to mathematically analyze the system, the results of which are then validated with actual or simulated barge tests requiring much lower shock levels that can be performed in the laboratory. Only after testing and validating the equipment design using this approach do Brooks et al. complete the equipment fabrication and subject the final equipment to the actual MIL-S-901D testing. Brooks et al. are primarily concerned with validating the equipment design before final shock testing to avoid the time and expense of a complete redesign cycle in response to a shock test failure and neither suggest nor consider any solution to the MIL-S-901D heavyweight secondary bubble pulse simulation problem.

A traditional underwater detonation induces a complex dynamic ship response that results from several different loading mechanisms. The prominent loading events are the initial shockwave and one or more ensuing bubble pulses. Secondary loadings include bulk and local cavitation closure, reflected pulses from nearby boundaries, and flow effects. The significance of these various loading mechanisms vary greatly depending on the attack geometry.

There is a clearly-felt need in the art for testing methods that employ non-explosive energy sources that provide a useful alternative to conventional barge shock testing methods. A desirable solution is a low-cost and environmentally-friendly non-explosive testing method capable of replicating the dynamic response induced by the complex loading mechanisms presented by a variety of underwater explosive attack scenarios. These unresolved problems and deficiencies are clearly felt in the art and are solved by this invention in the manner described below.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIG. 3 is a schematic diagram illustrating the mechanical elements of an alternative embodiment of the 2DOF system of FIG. 1;

FIG. 4 is a schematic diagram illustrating the mechanical elements of another alternative embodiment of the 2DOF system of FIG. 1;

FIG. 4A is a graph illustrating the piecewise linear spring constant of a spring element from FIG. 4;

DESCRIPTION OF THE PREFERRED EMBODIMENT

Figure 1:
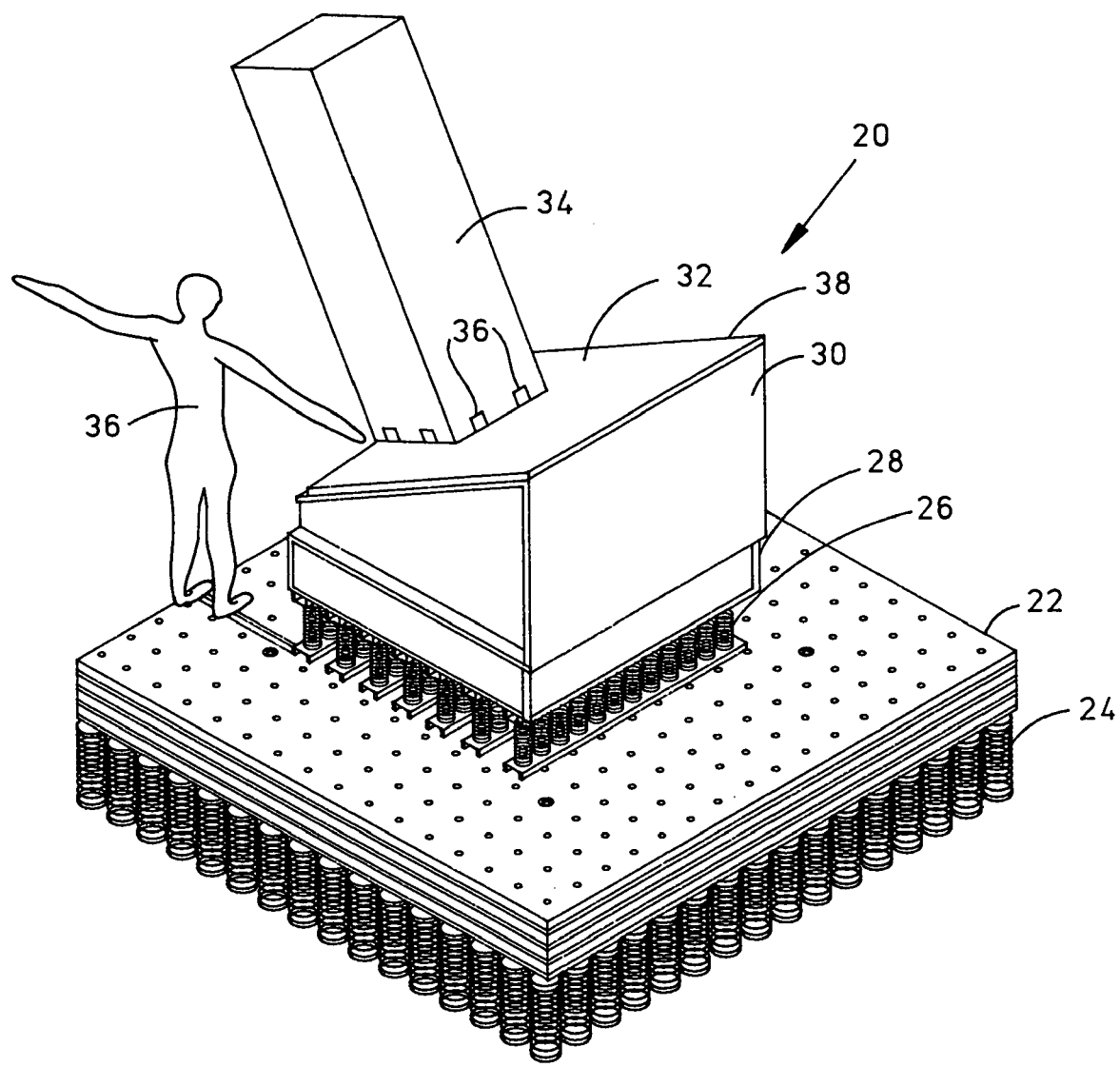
FIG. 1 is a perspective diagram illustrating a "two-degree-of-freedom" (2DOF) embodiment of the system of this invention.

FIG. 1 shows a perspective diagram of a "two-degree-of-freedom" (2DOF) embodiment 20 of the system of this invention. A first mass element 22 includes, for example, a stack of heavy steel plates fastened together is supported by the first spring element 24, which is coupled between mass 22 and a primary system supporting plane (not shown). Spring 24 includes scores of coil springs operating in parallel in the example shown. The second spring element 26 is coupled between mass 22 and another lighter mass (not separately labeled) that includes a steel assembly 28 coupled to a mounting adapter 30. The mass comprising frame 28 and adapter 30 may be considered to be a single mass element for the purposes of this invention. Adapter 30 provides a 30-degree tilted rigid mounting surface 32 on which the equipment 34 under test is fastened by means of the fasteners 36, for example. The 30-degree mounting angle can be changed to any desired value by replacing adapter 30 and it can be readily appreciated by those skilled in the art that the mounting angle may be selected as necessary for proper application of the simulated shock pulse to equipment 34. The exemplary scale of system 20 may be appreciated with reference to the human FIG. 36 shown.

Figure 2:
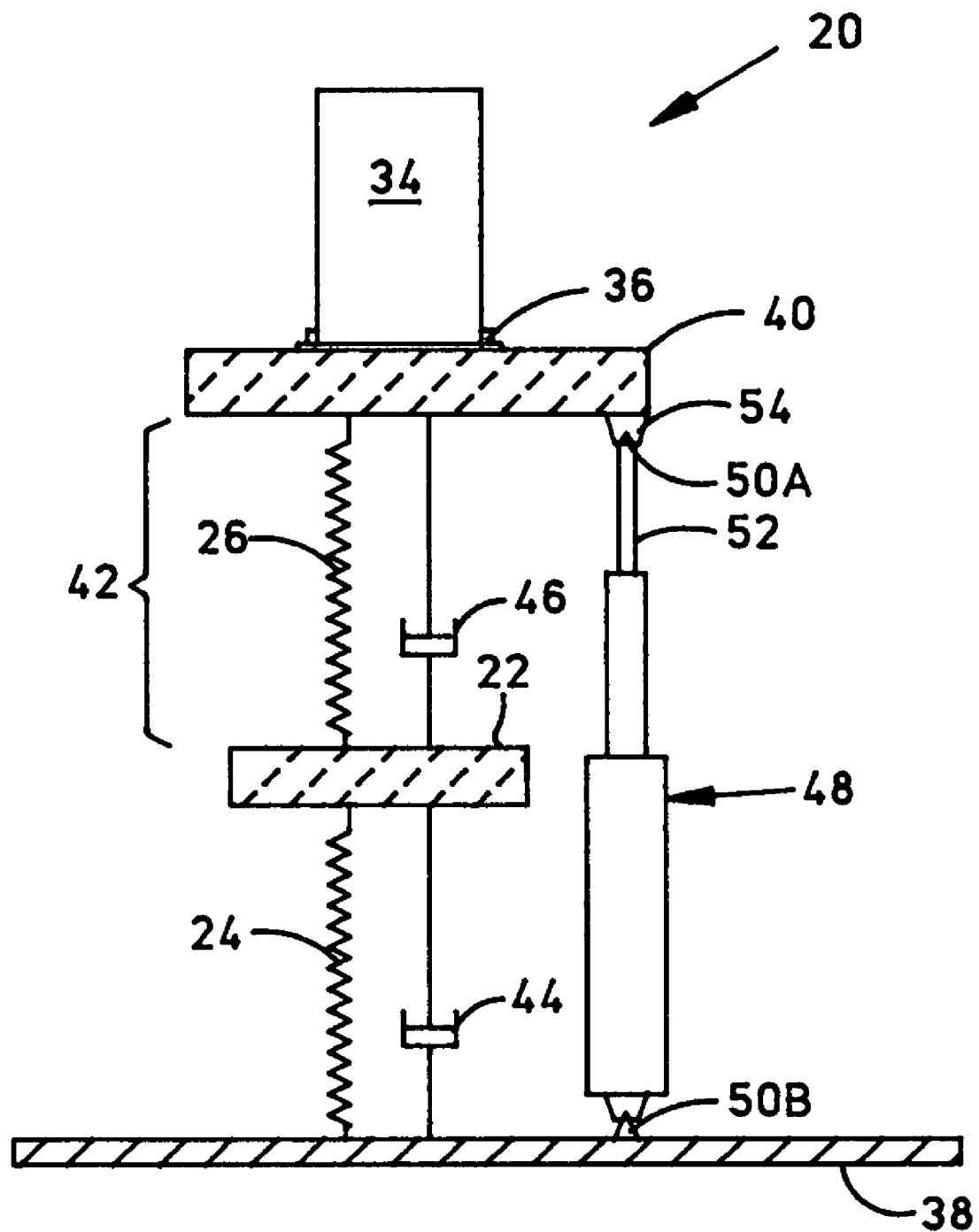
FIG. 2 is a schematic diagram illustrating the mechanical elements of the 2DOF system of FIG. 1.

FIG. 2 is a schematic diagram illustrating the mechanical elements of system of FIG. 1 with some additional elements shown that are not visible in FIG. 1. First mass element 22 is coupled to one end of first spring element 24, the other end of which is coupled to the primary system supporting plane 38. Second spring element 26 is coupled between mass 22 and a second mass 40. The pair of masses 22 and 40 each have a range of motion that is limited by a separation distance 42 that varies according to the deformation of spring 26 in the usual manner. System 20 is a 2DOF embodiment that is suited for use in testing principal units, in which case mass 22 is preferably an order of magnitude or more larger than mass 40. In FIG. 2, spring 26 is continuously coupled between the pair of masses 22 and 40 throughout the entire ranges of motion for both. A first damping element 44 is shown associated with the coupling of mass 22 to support plane 38, which includes all losses in spring 24 and may include additional damping means of any useful type known in the art. Similarly, a second damping element 46 is shown associated with the coupling of mass 40 to mass 22, which includes all losses in spring 26 and may include additional damping means of any useful type known in the art. The hydraulic cylinder 48 is disposed between mass 40 and supporting plane 38 and includes the connecting pins 50A and 50B as well as the connecting rod 52 and the end attachment hardware 54. Although a single spring and damper is shown for each mass, in practice, an array of springs and/or dampers is preferred. Although equipment 34 under test is shown to be hard-mounted to mass 40 by means of fasteners 36, other mounting means such as, for example, resilient shock isolators (not shown) may also be interposed between equipment 34 and mounting surface 32.

In operation, system 20 is set in motion by first deforming (e.g., compressing) in-series springs 24 and 26 with hydraulic cylinder 48, which serves as part of a "cocking apparatus" and which may include, for example, a plurality of such individual cylinders and their associated hydraulic power supplies (not shown). This process is slow but eventually accumulates a tremendous amount of potential energy in system 20 in the form of spring deformation, which is well-known in the art to be equal to $U_S = kx^2/2$ in a spring having a linear spring constant k that is deformed by distance x from it's rest state (e.g., an initial separation distance 42 is the rest state value of x for spring 26 in FIG. 2). The cocking apparatus may also be embodied as a group of screw drives with associated power supplies, or any other useful means for accumulating and storing energy $U_S$ in system 20 by deforming springs 24 and 26. The stored energy is then available for quick release to generate the desired shock pulse for coupling to equipment 34 under test. Hydraulic cylinder 48, connecting rod 52, pins 50A–B and end attachment hardware 54 together form a 'load-train' through which, for example, a tensile force is developed to balance the opposing compressive force in springs 24 and 26.

System 20 is cocked to the degree necessary to develop the desired shock motion. The loaded system is then triggered to cause a quick release of the stored energy, which sets system 20 in motion to create the desired shock pulse. The quick release may be achieved by means of a triggering element that, for example, includes a frangible link somewhere within the load train of the cocking apparatus. For example, in FIG. 2, pin 50A may be a frangible pin that is replaced after each operation of system 20. Such a frangible link may be selected to trigger the shock pulse at a desired stress level, representing a predetermined level of stored energy, for example. Alternatively, with proper configuration of hydraulic cylinder 48, the triggering element may include fast-acting hydraulic valves that can be operated to zero the pressure in cylinder 48, thereby releasing all tension in the load train of the cocking apparatus so that the motion of mass 40 is no longer constrained thereby. No frangible link is required with such a triggering element embodiment. Thus, hydraulic cylinder 48 can perform both the cocking and triggering functions: first actively retracting system 20 into its cocked state; and then quickly releasing and passively floating with the motion of mass 40, providing a slight damping effect. The degree of damping may be controlled with the hydraulic system's in-line valving and any available pressurized accumulators.

FIG. 3 is a schematic diagram illustrating the mechanical elements of another embodiment 56 of the 2DOF system of this invention that differs from system 20 (FIG. 2) only in that system 56 includes a mechanical stop 58 attached to mass 22. The purpose of the stop is to fix the maximum amount of downward displacement of mass 22, thereby limiting the range of motion thereof. When cocking system 56, mass 22 is retracted from an initial separation distance 60 until stop 58 bottoms out at supporting plane 38 at the reduced separation distance 62. The retraction of mass 40 continues without further displacement of mass 22 until the cocking operation is completed. Such a stop (not shown) may also be affixed to mass 40 to control its range of motion by limiting separation distance 42 alone or in combination with stop 58. The purpose of stop 58 is to assist in accumulating and storing the spring energy and relative mass displacements needed to achieve the desired mechanical shock event characteristics. However, without undue experimentation in view of these teachings, careful selection of spring stiffnesses and mass sizes should produce the necessary shock response spectra (SRS) and performance attributes without using any such stops.

FIG. 4 is a schematic diagram illustrating the mechanical elements of yet another embodiment 64 of the 2DOF system of this invention that differs from system 20 (FIG. 2) only in that system 64 includes a piecewise linear spring element 66 comprising the parallel springs 66A, 66B and 66C. The graph in FIG. 4A illustrates the piecewise linear spring constant $k_{66}$ of spring element 66. As mass 22 is displaced downward by $x_{22}$ from initial separation distance 60, the value of $k_{66}$ is determined by the spring constant of spring 66A alone. As the downward displacement $x_{22}$ increases, mass 22 eventually contacts spring 66B, changing the effective value of $k_{66}$ to the sum of the spring constants for springs 66A and 66B. Finally, as mass 22 contacts spring 66C, the value of $k_{66}$ is stepped up again by the contribution of the spring constant of spring 66C. Springs 66A–C are a group of springs in parallel, varying in height and in general having different spring constants and, of course, each of these three springs may be embodied as a plurality of physical elements or as a single physical spring. In effect, springs 66A–66C disposed in parallel provide an equivalent piecewise nonlinear spring 66 with the characteristic shown in FIG. 4A over the available range of motion of mass 60. This piecewise, nonlinear spring concept can be embodied with two or more individual springs disposed in parallel and may be used to replace spring 26 as well when necessary to achieve a desired SRS. System 64 is particularly well-suited for subjecting a principle unit to a SRS that simulates the shock effects of the secondary bubble pulses discussed above.

Figure 5:
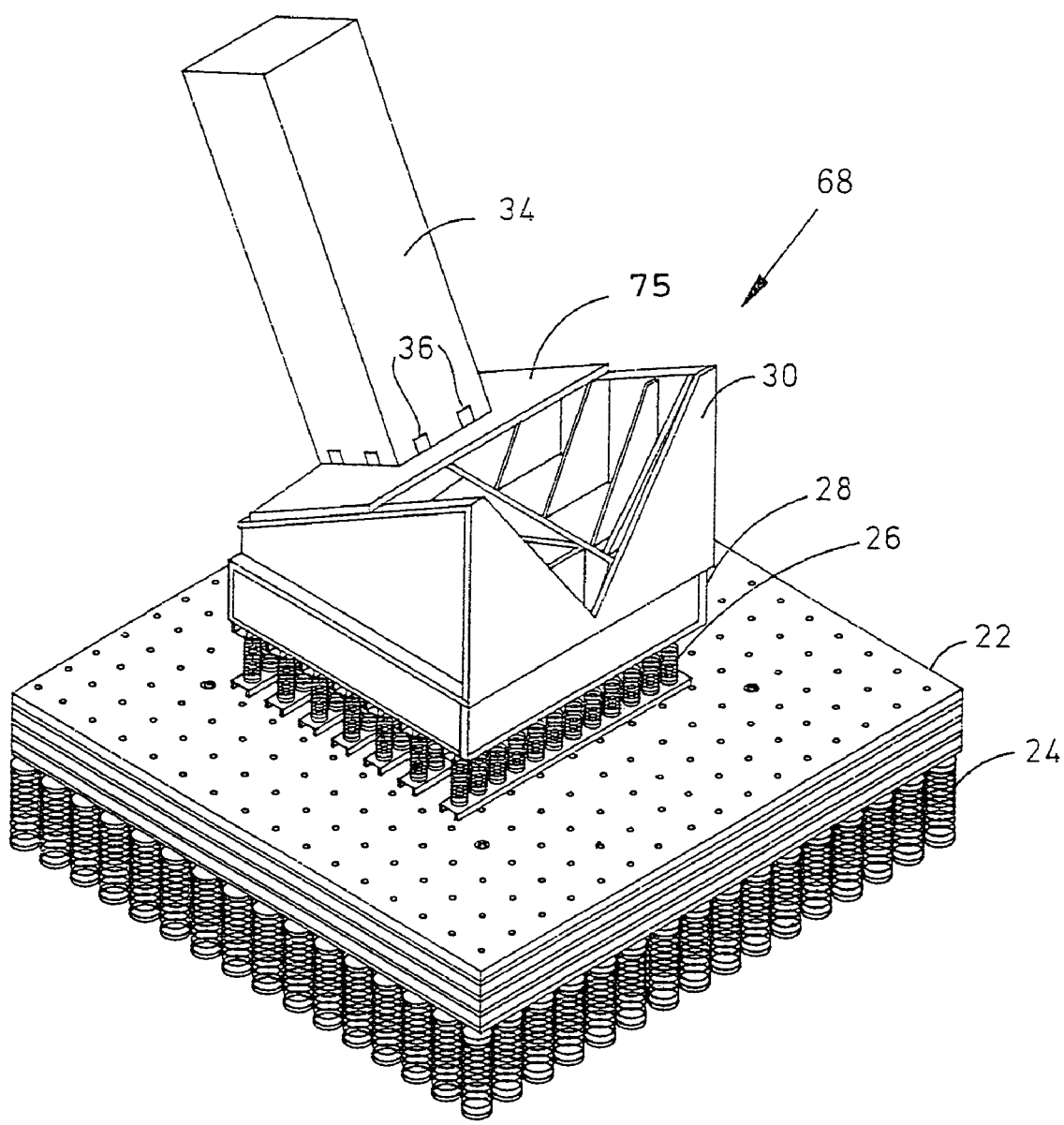
FIG. 5 is a perspective diagram illustrating a "three-degree-of-freedom" (3DOF) embodiment of the system of this invention.

FIG. 5 shows a perspective diagram of a "three-degree-of-freedom" (3DOF) embodiment 68 of the system. It differs from system 20 (FIG. 1) in that the rigid surface 32 is replaced with a flexible plate structure 75 that straddles the two rail surfaces of adapter 30. Flexible plate structure 75 may be considered a mass-spring combination element including mass 70 and a spring 72 (FIG. 6) for the purposes of this discussion.

Figure 6:
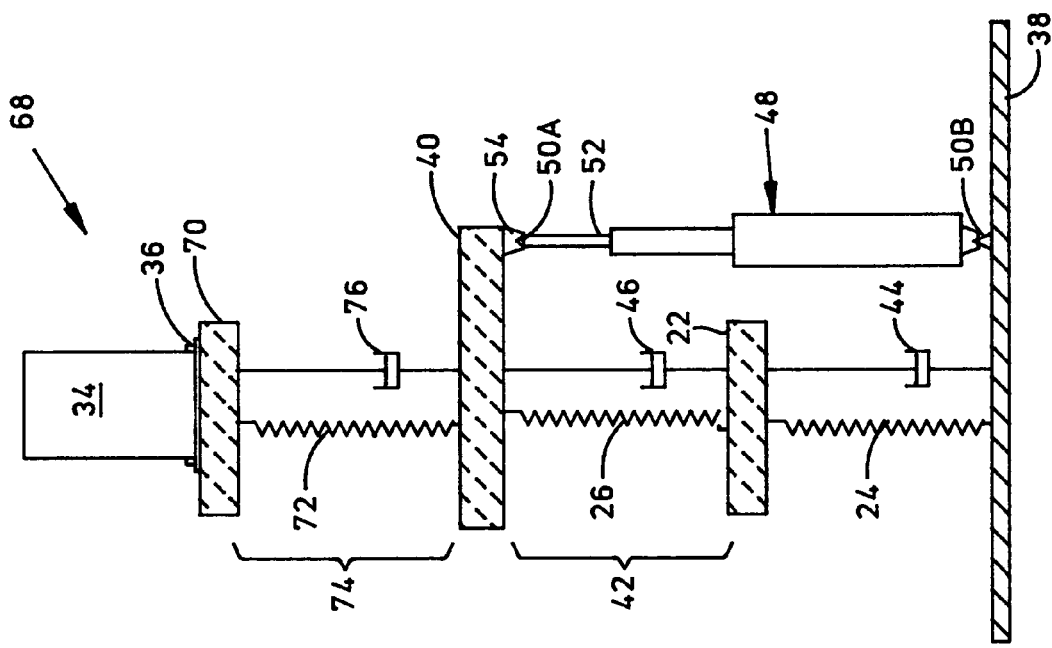
FIG. 6 is a schematic diagram illustrating the mechanical elements of a simple three DOF (3DOF) system of this invention of FIG. 5.

FIG. 6 is a schematic diagram illustrating the mechanical elements of system 68 of FIG. 5 and showing some additional elements that are not visible in FIG. 5. System 68 is generally adapted from system 20 (FIG. 2) by adding a third mass-spring system that includes the mass 70 and the spring 72, which spans the separation distance 74 between mass 70 and mass 40. The damping element 76 represents any losses in this third mass-spring system. Note that mass 70 is not drawn down by cocking apparatus 48 so that spring 72 is not available for storing any energy for contribution to the initial shock event. However, mass 70 and spring 72 can be selected to modify the SRS where necessary for acceptable shock testing of equipment 34 under test. System 68 can be configured for testing principal units or commercial off-the-shelf (COTS) subsidiary components disposed in resiliently-mounted electronic racks (i.e., isolated-rack mounted subsidiary components). When configured for testing principal units, mass 22 is preferably at least 4–5 times larger than mass 40, mass 40 is preferably considerably larger than mass 70, and masses 40 and 70 combined are preferably at least an order of magnitude larger than the mass of equipment 34 under test. When system 68 is configured for testing subsidiary components, fasteners 36 preferably do not include resilient mounting components, and mass 70 need not be considerably smaller than either mass 40 or mass 22 to obtain a particular SRS.

Figure 7:
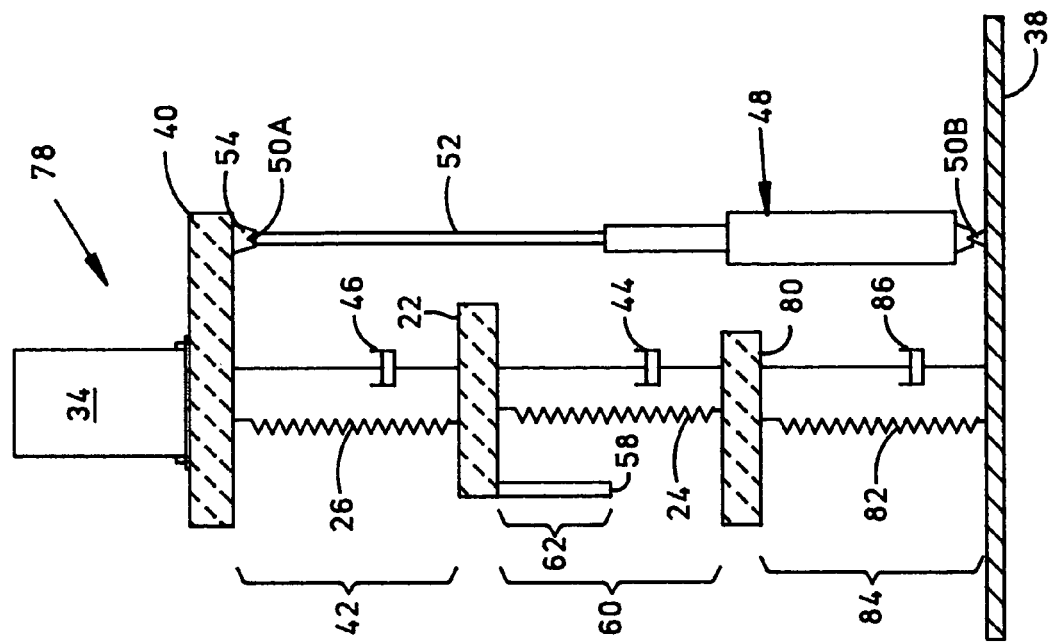
FIG. 7 is a schematic diagram illustrating the mechanical elements of an alternative embodiment of the 3DOF system of FIG. 5.

FIG. 7 is a schematic diagram illustrating the mechanical elements of an alternative embodiment 78 of the 3DOF system of this invention. System 78 is generally adapted from system 56 (FIG. 3) by adding a third mass-spring system that includes the lower mass 80 and the spring element 82, which spans the separation distance 84 between mass 80 and primary system supporting plane 38. The damping element 86 represents any losses in this third mass-spring system, including any additional damper and shock absorber elements. Note that mass 80 is drawn down by cocking apparatus 48 so that spring 82 is available for storing any energy for contribution to the initial shock event.

Figure 8:
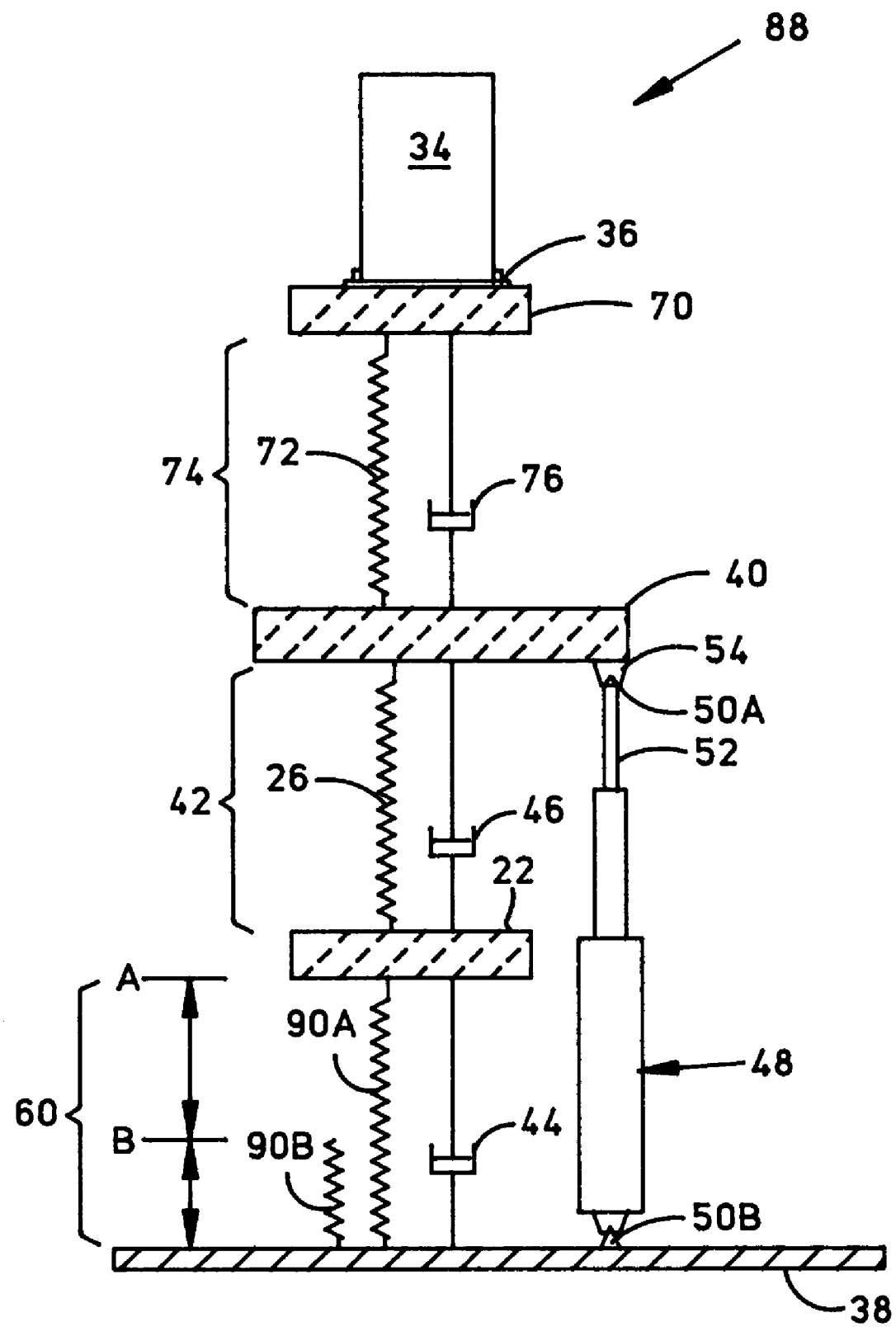
FIG. 8 is a schematic diagram illustrating the mechanical elements of another alternative embodiment of the 3DOF system of FIG. 5.

FIG. 8 is a schematic diagram illustrating the mechanical elements of yet another embodiment 88 of the 3DOF system of FIG. 6. Instead of spring element 24 (FIG. 6), system 88 employs a piecewise nonlinear spring element 90 similar in concept to spring element 66 from system 64 (FIG. 4). Spring element 90 includes the two parallel springs 90A and 90B, which function in a manner that can be readily understood with reference to the above discussion of system 64 (FIG. 4).

The response of the simple mass-spring oscillator system (e.g., FIG. 2) to any type of motion can be readily computed as a function of time. The maximum values of the response are of particular interest in the art. These maxima can be stated in terms of several different variables, including the maximum strain in the spring $u_m=D$, the maximum spring force, the maximum acceleration of the mass (which is related to the maximum spring force directly when there is no damping), and a quantity designated the pseudo velocity V, having the dimensions of velocity, that gives a measure of the maximum energy absorbed in the spring. Pseudo velocity V is defined in such a way that the energy absorption E in the spring is $\frac{1}{2}m V^2$. Thus, pseudo velocity $V=(2E/m)^{0.5}$. The relations among the maximum relative displacement of the spring D, the pseudo velocity V, and the pseudo acceleration A, which is a measure of the force in the spring, are $$V = \Omega D \quad \text{[Eqn. 1]}$$

$$A = \Omega V = \Omega^2 D \quad \text{[Eqn. 2]}$$

The pseudo velocity V is nearly equal to the maximum relative velocity for systems with moderate or high frequencies but may differ considerably from the maximum relative velocity for very low frequency systems. The pseudo acceleration A is exactly equal to the maximum acceleration for systems with no damping and is not greatly different from the maximum acceleration for systems with moderate amounts of damping, over the whole range of frequencies from very low to very high values.

SRS plots are typically used in the art to show the system response as a function of period or frequency. The SRS are often shown in the form of pseudo velocity versus cyclic frequency on tripartite paper. This useful plot, which indicates at one and the same time the values for D, V, and A, is well-known in the art and is used in FIGS. 8–11. This plot has the virtue that it also indicates more clearly the extreme or limits of the various parameters defining the response. All parameters are plotted on a logarithmic scale. The pseudo velocity is plotted on a vertical scale. Then on diagonal scales along an axis that extends upward from right to left are plotted values of the acceleration, and along an axis that extends upward from left to right the displacement is plotted, in such a way that any one point defines for a given frequency the displacement D, the pseudo velocity V, and the acceleration A.

Figure 9:
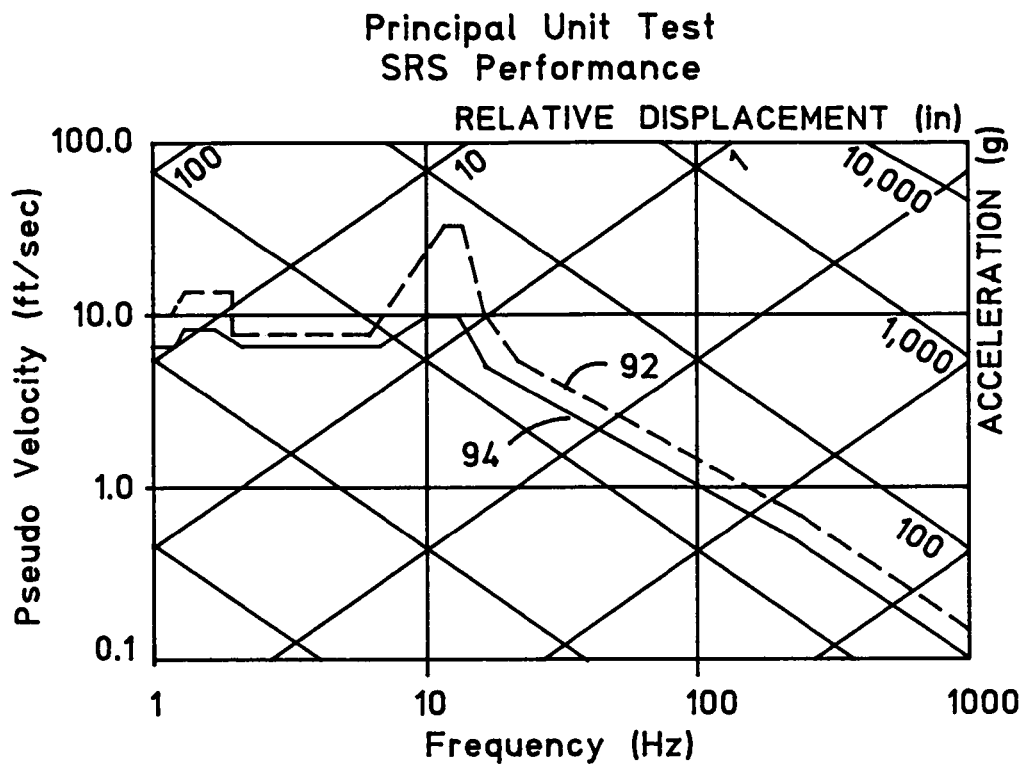
FIG. 9 is a chart illustrating an exemplary shock response spectra (SRS) produced by the system of this invention for a principle unit test.
Figure 10:
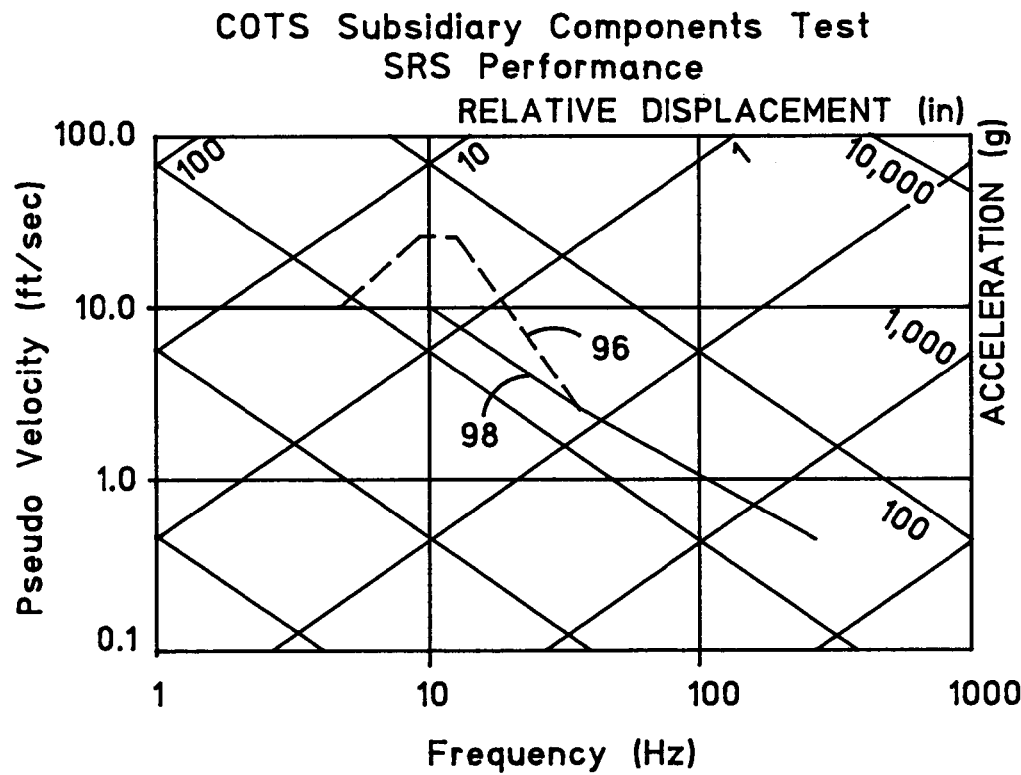
FIG. 10 is a chart illustrating an exemplary SRS produced by the system of this invention for an isolated-rack-mounted subsidiary component.

FIG. 9 is a chart illustrating an exemplary SRS produced by one embodiment of the system of this invention at the mounting location of a principle unit test wherein the SRS meets or exceeds the dotted limit line 92 with a five percent (5%) damping factor and meets or exceeds the solid limit line 94 with a twenty-five percent (25%) damping factor. FIG. 10 is a chart illustrating an exemplary SRS produced by another embodiment of the system of this invention at the mounting location of an isolated-rack mounted subsidiary component test wherein the SRS meets or exceeds the dotted limit line 96 with a five percent (5%) damping factor and meets or exceeds the solid limit line 98 with a twenty-five percent (25%) damping factor.

Figure 11:
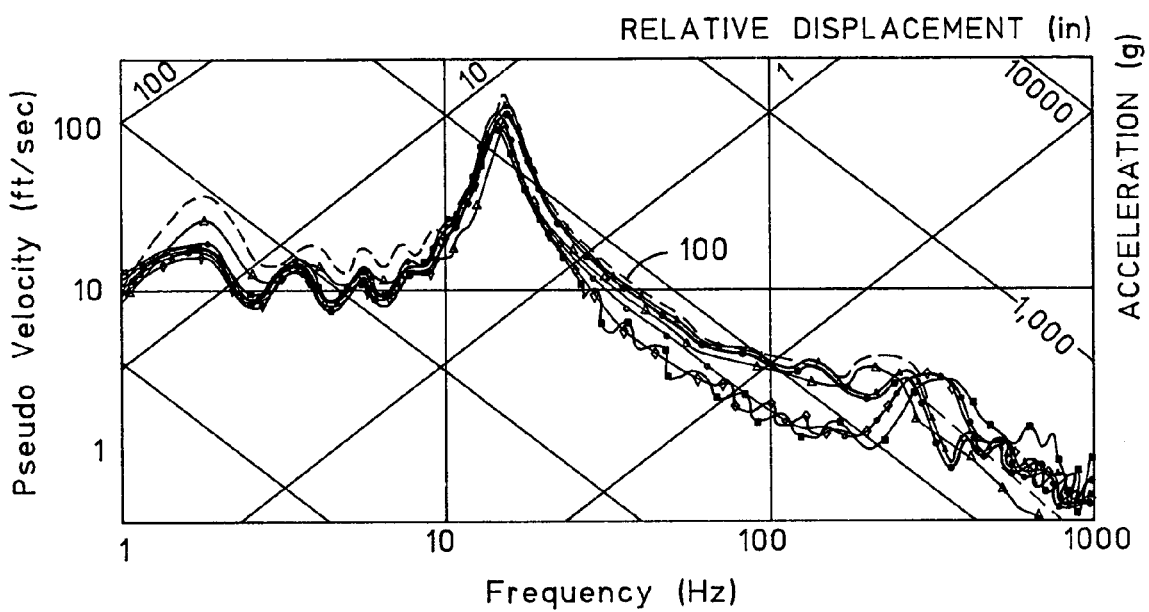
FIG. 11 is a chart comparing the vertical SRS component measured during an equipment test using the system of this invention with the vertical SRS component measured during an actual heavyweight barge test.
Figure 12:
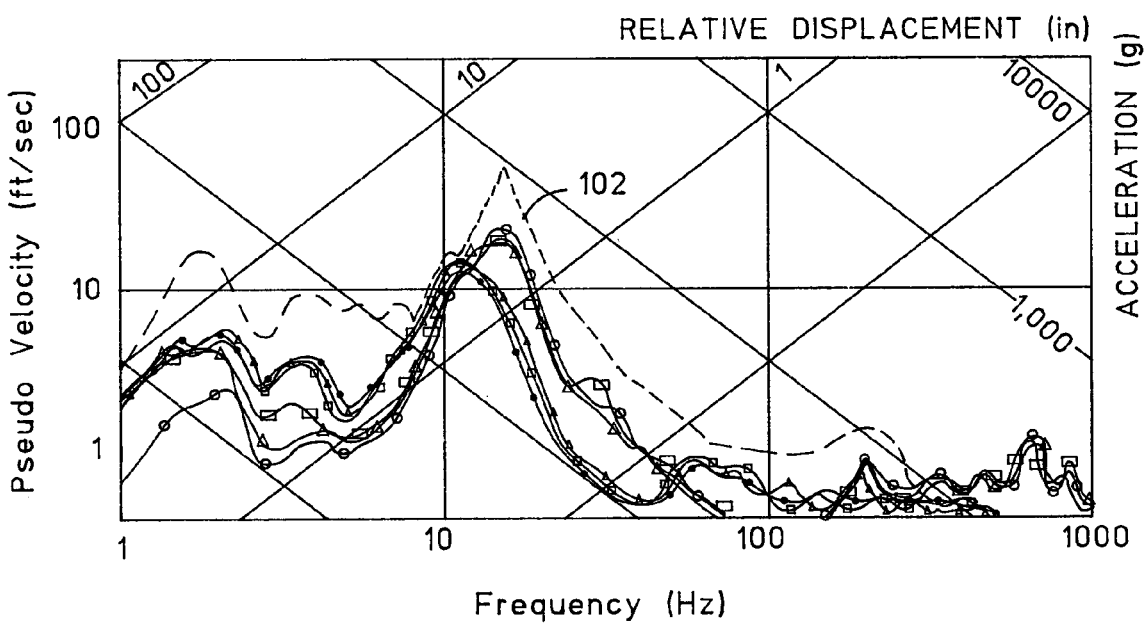
FIG. 12 is a chart comparing the horizontal SRS component measured during an equipment test using the system of this invention with the horizontal (athwartship) SRS component measured during an actual heavyweight barge test.

FIG. 11 is a chart comparing the vertical SRS component 100 measured during an equipment test using the system of this invention with the vertical SRS component measured during several actual heavyweight barge tests. FIG. 12 is a chart comparing the horizontal SRS component 102 measured during an equipment test using the system of this invention with the horizontal (athwartship) SRS component measured during several actual heavyweight barge tests. FIGS. 11–12 demonstrate the utility of the system of this invention for simulating actual barge shock spectra.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

It will be understood that many additional changes in the details, materials, steps and arrangement of parts, which have been herein described and illustrated to explain the nature of the invention, may be made by those skilled in the art within the principal and scope of the invention as expressed in the appended claims.

The invention claimed is:

1. A shock simulation system comprising:
    a support plane;
    a first mass element;
    a first spring element coupled between the support plane and the first mass element;
    a second mass element;
    a second spring element coupled between the first mass element and the second mass element;
    a cocking apparatus interposed between the support plane and the second mass element, the cocking apparatus being capable of accumulating and storing energy in the first and second spring elements; and
    a trigger means for releasing the energy stored in the first and second spring elements and causing a mechanical shock event that is substantially transferred to the second mass.

2. The system of claim 1 wherein the first spring element has a piecewise nonlinear spring constant.

3. The system of claim 1 wherein the system has two degrees of freedom of motion.

4. The system of claim 1 wherein the system has three degrees of freedom of motion.

5. The system of claim 1, wherein the trigger means comprises a frangible link coupled between the cocking apparatus and the second mass element.

6. The system of claim 1, wherein the trigger means comprises a hydraulic valve operably coupled to the cocking apparatus.

7. The system of claim 1, wherein the cocking apparatus is at least one hydraulic cylinder.

8. The system of claim 1, wherein the cocking apparatus is at least one screw drive.

9. The system of claim 1, further comprising:
    a mechanical stop rigidly connected to the first mass element; and
    wherein the mechanical stop is capable of limiting a range of motion of the first mass element with respect to the support plane.

10. The system of claim 1, further comprising:
a third mass element; and
a third spring element coupled between the second mass element and the third mass element.

11. The system of claim 1, further comprising:
a first damping element coupled between the support plane and the first mass element; and
a second damping element coupled between the first mass element and the second mass element.

12. The system of claim 10, further comprising:
a first damping element coupled between the support plane and the first mass element;
a second damping element coupled between the first mass element and the second mass element; and
a third damping element coupled between the second mass element and the third mass element.

13. The system of claim 1, further comprising:
an adaptor rigidly connected to the second mass element, the adaptor comprising a mounting surface, the angle of the mounting surface with respect to the support plane being adjustable.

14. The system of claim 1, wherein the first mass element has a mass of $M_1$ and the second mass element has a mass of $M_2$, where $M_1$ is an order of magnitude larger than $M_2$.

15. A shock simulation system comprising:
a support plane;
a first mass element;
a first spring element coupled between the support plane and the first mass element;
a second mass element;
a second nonlinear spring element coupled between the first mass element and the second mass element;
a cocking apparatus interposed between the support plane and the second mass element, the cocking apparatus being capable of accumulating and storing energy in the first spring element and the second nonlinear spring element; and
a trigger means for releasing the energy stored in the first spring element and the second nonlinear spring element, and causing a mechanical shock event that is substantially transferred to the second mass.

16. The system of claim 15, further comprising:
a third mass element; and
a third spring element coupled between the second mass element and the third mass element.

17. A shock simulation system comprising:
a support plane;
a first mass element;
a first spring element coupled between the support plane and the first mass element;
a second mass element;
a second spring element coupled between the first mass element and the second mass element;
a third mass element;
a third spring element coupled between the second mass element and the third mass element;
a cocking apparatus interposed between the support plane and the third mass element, the cocking apparatus being capable of accumulating and storing energy in the first, second, and third spring elements; and
a trigger means for releasing the energy stored in the first, second, and third spring elements and causing a mechanical shock event that is substantially transferred to the third mass.

18. The system of claim 17, further comprising:
a mechanical stop rigidly connected to the second mass element; and
wherein the mechanical stop is capable of limiting a range of motion of the second mass element with respect to the first mass element.

19. The system of claim 17, wherein the trigger means comprises a frangible link coupled between the cocking apparatus and the third mass element.

20. The system of claim 17, wherein the trigger means comprises a hydraulic valve operably coupled to the cocking apparatus.

* * * * *